Feb. 11, 1969
S. B. JONES
3,426,399
CLAMPING DEVICE
Filed Oct. 12, 1966
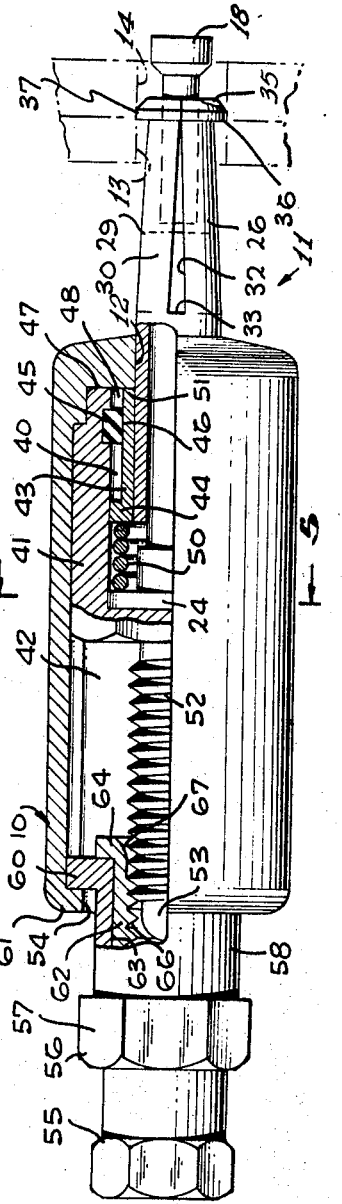
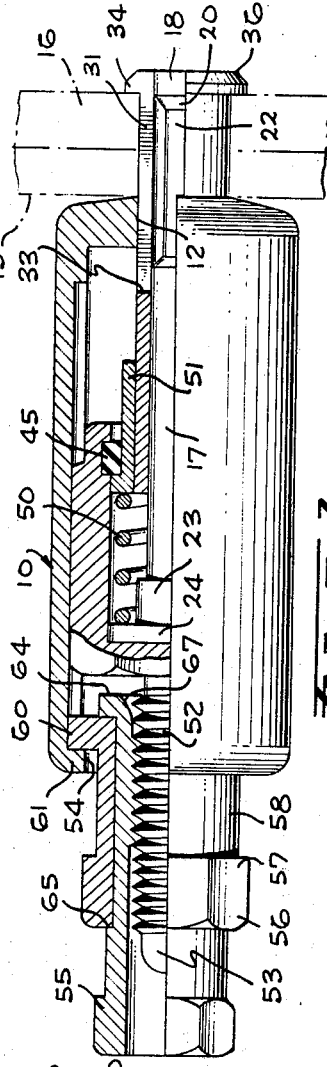
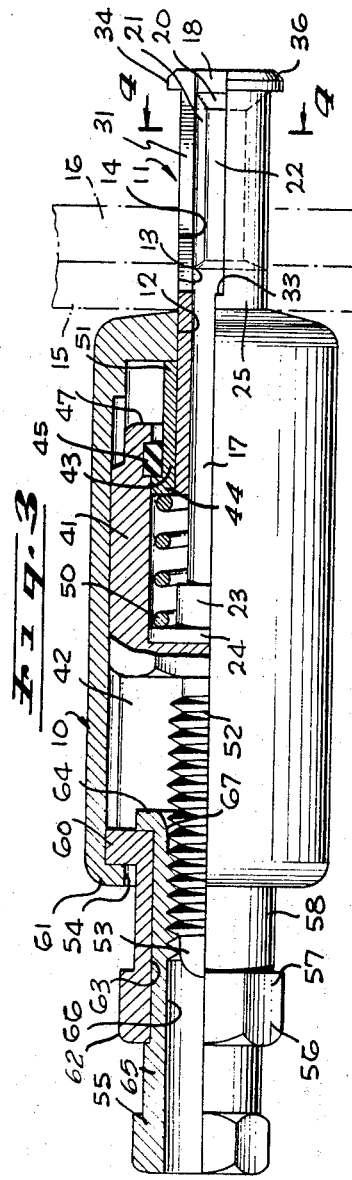
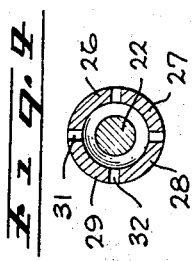
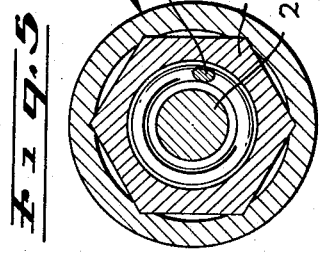
STERLING B. JONES
INVENTOR.
BY
R. E. Geauque
ATTORNEY

United States Patent Office 3,426,399
Patented Feb. 11, 1969

3,426,399
CLAMPING DEVICE
Sterling B. Jones, West Covina, Calif., assignor to Monogram Industries, Inc., Culver City, Calif., a corporation of California
Filed Oct. 12, 1966, Ser. No. 586,126
U.S. Cl. 24—211                         12 Claims
Int. Cl. F16b 2/14

ABSTRACT OF THE DISCLOSURE

A sheet metal clamp for temporarily holding a pair of workpieces together is disclosed herein providing a tubular body having an axial aperture formed in one end thereof and an opening coaxial with the aperture formed in its other end. Clamping means are slidably mounted in the body for reciprocal movement through the aperture between a clamping position and an unclamped position with respect to the workpieces. Actuating mechanism is slidably carried by the body and is operatively coupled to the clamping means to effect movement of the clamping means with respect to said body and means adapted for powered rotation are rotatably mounted in the body opening which operatively couple the actuating means to the body for forcibly protracting and retracting the clamping means between its alternate positions.

---

This invention relates to fastening devices of the type employed for temporarily securing together work pieces such as metal sheets or plates preparatory to the riveting or other permanent fastening thereof.

Sheet metal clamps of this type have been employed in the past wherein a pair of spring-loaded laterally spreadable clamping pins are mounted in a cylindrical body for reciprocal movement through an opening in the end thereof past a stationary spreader mounted between the pins. Such clamps operate to engage in clamp work sheets between enlarged outer ends of the pins and the outer end of the body. While clamps of this general type are well known in the art, difficulties have been experienced in assemblying the clamps due to the actuating mechanisms employed therefor, which difficulties have increased the cost thereof. In sheet metal work, such as aircraft construction, such clamps are used in large quantities and any improvement which is conducive to reducing the cost thereof is of considerable importance. The assembly difficulties have arisen because of the fact that the interior construction generally requires assembly work which can only be done efficiently upon a jig or fixture. Additional difficulties have been experienced in first making the sub-assembly of the interior parts and subsequently mounting them in the body.

A further shortcoming of prior clamping devices is that the actuating mechanism employed to advance and retract the spreader bar so as to effect expansion or contraction of the enlarged headed pins is manually operated and generally requires a special tool which engages a flange on the clamp body and the rearward projecting ends of the spreader pins. By grasping the special tool which is generally of a plier type, an internal spring is compressed to effect the advance of the spreader bar to expand the pin heads. The construction of the prior art devices does not lend itself to the use of automatic or power driven tools such as nut runner guns or the like that are normally used in connection with temporary spin-free clamps not of the compressible spring type. The ability to be able to employ power driving equipment and tools is particularly advantageous in instances where a multiplicity of clamping devices are to be employed for temporarily securing work sheets together, since each individual clamp may more rapidly be actuated to its clamping and unclamping condition than can otherwise be had. Also, a more positive clamping action is achieved as well as more reliable assurance that the clamping device is properly loaded to perform its clamping function. Additionally, by reversing the rotation of the power tool, the clamped pins can be more readily released to effect the removal thereof than can otherwise be accomplished by manual means.

Furthermore, the introduction of exotic materials and extremely close tolerances holes employed in modern aircraft fabrication necessitates the avoidance of conventional two-headed clamping devices that may mark or mar the sheet surface about the periphery of the hole or that will damage the inner wall structure of the sheet defining the hole. To obviate these problems, the present invention embraces the concept of employing an extendable mandrel having a greater surface exposure applicable to the hole wall surface so that the aligned holes are substantially filled and indexed in a manner that maintains the pair of sheets in substantial alignment so that slippage between the sheets is avoided. Also, by incorporating a mandrel head having a greater surface contact with the periphery of the hole than is employed in conventional two-headed needle-type clamping devices, assurance is had that a more reliable and damage-free clamping action will ensue.

Therefore, the present invention offers a larger surface area in clamping contact with not only the periphery of the hole but with the wall structure defining the mated holes, which gains increased indexing characteristics.

Accordingly, a clamping device incorporating the present invention is provided which is adapted to be operated by a conventional power driving tool, such as a nut runner, for example, that includes a cylindrical body for mounting a reciprocating expandable member and spreader element combination which is advanced and retracted by an actuating mechanism adapted to be seated in holding and driving chucks carried by the power tool. Resilient means are carried in the body for normally biasing the expandable member into its expanded condition when the spreader element is actuated to its advanced position.

Therefore, it is a primary object of the present invention to provide a novel clamping device for aligning and securing plates or sheets to each other by a reliable and positive clamping action.

Another object of the present invention is to provide a novel connector or clamping device which can be operated by conventional power equipment or tools to both clamp and unclamp the device in restricted spaces and in areas where the back of the work to be secured is inaccessible.

Another object of the present invention is to provide a novel clamping device having means to secure positive alignment of the parts to be connected wherein such means include powered actuating mechanism for advancing and retracting a combined spreader and expandable element.

Still a further object of the present invention is to provide a novel clamping device by means of which connecting or clamping pressure can be applied symmetrically about the periphery of the aligned holes in the plates or sheets for securing the plates or sheets to be connected without distortion or straining thereof.

The present invention, both as to its organization and manner of operation, together with further objects and advantages thereof, may best be understood by reference to the following description, taken in connection with the accompanying drawings, in which:

FIGURE 1 is a side elevational view of the novel clamping device of the present invention and is illustrated as being partially broken away to expose the internal mechanisms thereof;

FIGURE 2 is a view similar to the view of FIGURES 1 and 2 illustrating the clamp in its clamping position for retaining the workpieces together;

FIGURE 3 is a view similar to the view of FIGURE 1 illustrating the clamping device in a position preparatory to effecting a clamping action with respect to a pair of work sheets;

FIGURE 4 is a cross-sectional view of the clamp taken in the direction of arrows 4—4 of FIGURE 3; and FIGURE 5 is a cross-sectional view of the clamp shown in FIGURE 1 as taken in the direction of arrows 5—5 thereof.

Referring to FIGURE 1, a novel clamping device in accordance with the present invention is illustrated which includes a cylindrical body 10 that movably houses a mandrel assembly indicated by the arrow 11. The assembly 11 is adapted to rectilinearly slide through an aperture 12 formed in one end of the body and is adapted to be inserted through aligned coaxial apertures 13 and 14 formed respectively in a pair of abutting plates 15 and 16. The mandrel assembly includes a spindle 17 having an enlarged head 18 carried on one end thereof and an annular sloping rear surface 20 terminating in a recess 21 formed in the shank of the spindle so as to provide a shank portion 22 of reduced diameter. The end of the spindle opposite to its end 18 is suitably secured to a retainer 23 which incorporates an annular flange 24 formed on one of its extreme ends.

The mandrel assembly also includes a tubular mandrel clamp member 25 that is slidably carried on the spindle shank and which includes a plurality of segments 26–29 inclusive as shown in FIGURE 4, cantilevered from its major length as indicated by numeral 30. The segments are separated by a pair of slots 31 and 32 that coaxially extend perpendicularly to each other through the clamp member from one end thereof to a terminating root point 33 substantially located midway between the opposite ends of the clamp member. The segments are prestressed at their respective root adjacent point 33 so as to be normally biased into abutting engagement with the shank portion 22 as shown in FIGURE 1. The longitudinal slots allow for radial expansion of the segments as the clamp member moves over the spindle due to the sliding engagement of the extended ends of the segments with the rearwardly sloping surface 20 of the enlarged head 18. The terminating end of each segment is provided with an integrally formed shoulder indicated by one of the numerals 34–37 whereof each shoulder represents a quadrant of a circle and the shoulders are adapted to engage with the surface of the plate 16 surrounding the aperture 14.

The mandrel assembly is carried within an open ended cavity 40 formed in a hexagonal shape nut or body 41 that is adapted to rectilinearly move within a chamber 42 defined by the hex-shaped inner surface of the body 10. Also included within the cavity 40 and adapted to slide therein is a collar member 43 having an annular flange 44 formed on one end thereof. The member 43 is preferably carried on the end of the mandrel clamp opposite to its end formed with the shoulders 34–37 so that the collar member 43 and clamp member 25 slide together as a unit within the cavity 40 on the shank of the spindle 17. The outwardly extending flange 44 preferably slidably engages with the wall of the nut 41 defining the cavity 40 so that as the mandrel clamp member 25 is retracted or advanced, the engagement of the flange 44 with the cavity walls serves as a guide or support therefor.

Located adjacent the end of the nut 41 nearest to the end of the body 10 having aperture 12 formed therein, a bearing washer 45 is provided that is annular in shape and that provides an inner bearing surface 46 that is carried in slidable engagement with the outer surface of the collar member 43. The bearing washer 45 serves as a stop for the mandrel clamp member 25 to prevent the member 25 from advancing once the clamp has been installed on the plate as seen in FIGURE 3.

The extreme end of nut which extends beyond the bearing washer 45 is indicated by numeral 47 and is shown in FIGURE 1 as being received within a bore of reduced diameter indicated by numeral 48. An expansion spring 50 is incorporated within the cavity 40 and is arranged to expand against the flange 24 of the retainer and the flange 44 carried on the collar member 43. Normally, the spring 50 serves to bias the mandrel clamp member 25 into its advanced position; however, as shown in FIGURE 1, spring 50 is fully compressed due to the fact that a terminating end 51 of the member 43 is in abutting engagement with the end of the body 10.

Fixedly secured to the end of the nut 41, there is provided a threaded shank 52 that is arranged in coaxial relationship with the body 10 and that extends rearwardly within the body 10 to a substantial distance from the end of nut 41, where the threaded shank 52 terminates in a rounded knob 53.

The end of body 10 opposite to its end formed with aperture 12 is provided with a hole 54 through which a spin nut 55 projects as rotatably carried by a fixed nut 56. It is to be particularly noted that the fixed nut 56 includes a hexagonal shaped head 57 and a cylindrical shank 58 that terminates on its end opposite to its end carrying the head 57 in an annular flange 60 that outwardly projects into engagement with a turned over lip 61 forming a part of the body 10. During manufacturing or assembly operations or procedures, the lip 61 is rolled or folded over the flange 60 to achieve securement between the fixed nut 56 and the body 10.

The spin nut 55 includes an elongated shank 62 adapted to rotate or spin within an internal bore 63 of the fixed nut 56. One end of the shank 62 terminates in an outwardly extending flange 64 that rotatably abuts against the exterior surface of the flange 60 of the fixed nut. The shaped head 57 of the nut 56 is seated on the shank 62 and the shank 62 terminates in a shoulder portion 65, as shown more clearly in FIGURE 3, so that the rotating nut 55 is maintained in a spin free condition rotatably mounted in a bore 63 of the fixed nut 56.

It is to be particularly noted that the spin nut 55 includes a threaded internal bore 66 that is adapted to rotatably engage with the threaded shank 52 of the nut 41. The mouth of the bore 66 surrounded by the flange 64 is intentionally void of a few thread turns so as to provide a smooth bell-shaped mouth or entrance 67 leading into the threaded bore 66. The bell-shaped entrance 67 is adapted to accommodate spin free rotation of the device wherein the knob 53 may be disposed within the mouth 67 while the nut 55 may be rotated in one direction. However, in the event the nut 55 is rotated in the opposite direction, the threads of the bore 66 will engage with the thread of the shank 52 to effect longitudinal displacement of the nut 41 within the hollow of the body 10.

In view of the foregoing, it can be seen that the device of the present invention may be suitably actuated by means of a power tool such as a conventional powered nut runner whereby the fixed portion of the nut runner may suitably engage the shaped head 57 of the fixed nut 56 while the powered rotatable chuck of the nut runner may be engaged with the fixed head of the rotatable nut 55. As shown in FIGURE 1, the mandrel assembly 11 is initially positioned within the apertures 13 and 14 of the plates 15 and 16 with the nut 41 in its furthermost advanced position. Next, the nut runner is actuated so as to rotate rotatable nut 55 which causes the threads in bore 66 to engage with the threads on shank 52 to effect the rearward movement of nut 41 as indicated in FIGURE 3. As the nut 41 moves rearwardly, expansion spring 50 expands to forcibly urge member 43 into engagement so that its flange 44 abuts against the bearing washer 45 as shown in FIGURE 2. The expansion spring 50 also forcibly urges the spindle 17 to be retracted as the nut 41 moves rearwardly so that the enlarged head 18 of the spindle forces the segments 26–29 outwardly into their spread or expanded position.

Referring now to FIGURE 2, the nut 41 is fully retracted and the complete mandrel assembly 11 is retracted due to the engagement of flange 44 with the bearing washer 45 so that the mandrel assembly is withdrawn into the body 10 of the clamp. In this position, the shoulders of the respective segments clasp or grasp with the exposed surface of plate 16 while the extreme end of the body 10 abuts against the exposed surface of plate 15. The clamping forces generated are completed via a load transmission path from the segment shoulders through the spindle, nut 41 and its threaded coupling with the nut 55 and through nut 56 into the body 10.

A feature of the present invention resides in the fact that when it is desired to release or disengage the clamp from its position as shown in FIGURE 2, the powered nut runner may be employed to break the clamping action of the device. This may readily be achieved by reversing the power of the nut runner so that the nut 55 will be rotated in an opposite direction from that direction normally employed to retract the mandrel clamp assembly 25.

Therefore, it can be seen that the novel clamping device of the present invention incorporates an actuating mechanism for advancing or retracting the mandrel assembly to effect clamping action or the release thereof by means of a conventional power tool. The clamping action achieved is completely balanced and reliable and the actuating mechanism is trouble-free in operation. By employing modern metal rolling or folding techniques, assembly of the actuating mechanism within the body of the clamping device is relatively easily achieved which is reflected in reduced cost of the device.

It is to be understood that the form of the present invention specifically shown and described is to be taken as a preferred example of the same and that various changes in the size and arrangement of parts may be resorted to without departing from the spirit of the invention.

What is claimed is:

1. a sheet metal clamp for temporarily holding a pair of workpieces together comprising:
  a tubular body having an axial aperture formed in one end thereof and an opening coaxial with said aperture formed in its other end;
  clamping means slidably mounted in said body for reciprocal movement through said aperture between a clamping position and an unclamped position with respect to the workpieces;
  actuating mechanism slidably carried by said body and being operatively coupled to said clamping means to effect movement of said clamping means with respect to said body;
  means adapted for powered rotation and rotatably mounted in said body opening and operatively coupling said actuating means to said body for forcibly protracting and retracting said clamping means between its alternate positions; and
  said clamping means includes a spindle having an enlarged head terminating at its end located exteriorly of said body; and
  a mandrel clamp member slidably carried on said spindle having cantilevered segments biased to draw the terminating ends of said segments together so as to reduce the diameter of said member when said clamping means is in said unclamped position and being adapted to be engaged by said enlarged head to expand said segment ends outwardly as said member slidably advances on said spindle to said clamping position.

2. The invention as defined in claim 1 wherein said actuating mechanism includes:
  a nut element slidably carried in said body and having a cavity formed therein for mounting said clamping means;
  stop means carried on said nut element for limiting the axial movement of said clamp member on said spindle; and
  resilient means compressed between said spindle and said clamp member for normally biasing said clamp member into its advanced position.

3. The invention as defined in claim 2 wherein said nut element further includes a threaded shank rearwardly extending therefrom and wherein said powered means is selectively engagable therewith to slidably move said nut element and said clamping means relative to said body.

4. A sheet metal clamp comprising:
  a tubular body having a forward end closure formed with an axial aperture therethrough and having an annular inwardly-extending shoulder at its end defining an opening therethrough;
  a clamping assembly slidably mounted in said body for reciprocal movement through said aperture; said assembly including a spindle terminating in an enlarged head on one end thereof and a clamp member having expandable segments cantilevered from the major length of said member normally having the terminating ends thereof yieldably engaged and adapted to clampingly engage one surface of a pair of workpieces;
  a non-rotatable nut element slidably carried in said body having a threaded shank adapted to reciprocally move through said opening defined by said annular shoulder;
  means carried on said nut element selectively engageable with said clamping assembly for advancing said clamp member on said spindle to effect expansion of said segments as said segments encounter said enlarged head and for retracting said clamp member to collapse said expanded segments; and
  rotatable means operatively coupling said threaded shank to said body whereby rotation in one direction effects the expansion and yielding of said segments and rotation in the opposite direction effects the collapse of said segments.

5. The invention as defined in claim 4 including a fixed nut secured to said body within said opening and having a smooth bore extending therethrough and wherein said rotatable means includes a rotatable nut carried in said bore; said fixed nut being adapted to detachably couple with the fixed chuck of a power driven tool and said rotatable nut being adapted to detachably connect with the powered rotating chuck of the tool.

6. A sheet metal clamp for temporarily holding a pair of workpieces together comprising:
  a tubular body having an axial aperture formed in one end thereof and an opening coaxial with said aperture formed in its other end;
  clamping means slidably mounted in said body for reciprocal movement through said aperture between a clamping position and an unclamped position with respect to the workpieces and which includes;
    a spindle having an enlarged head terminating at its end located exteriorly of said body, and a mandrel clamp member slidably carried on said spindle having cantilevered segments adapted to engage said enlarged head to expand outwardly as said member slidably advances on said spindle;
  actuating mechanism slidably carried by said body and being operatively coupled to said clamping means to effect movement of said clamping means with respect to said body and which includes,
    a nut element slidably carried in said body having a cavity formed therein for mounting said clamping means and a threaded shank rearwardly extending therefrom,
    stop means carried on said nut element for limiting the axial movement of said clamp member on said spindle and which includes a collar fixed on said clamp member and having a radial flange and a bearing washer fixed on said nut element extending into the travel path of said flange as said clamp member advances whereby the engagement of said flange with said washer restricts the advancement of said clamp member, and resilient means compressed between said spindle and said clamp member for normally biasing said clamp member into its advanced position;

means adapted for powered rotation and rotatably mounted in said body opening and operatively coupling said actuating means to said body for forcibly protracting and retracting said clamping means between its alternate positions, and wherein said powered means is selectively engageable with said threaded shank of said nut element to slidably move said nut element and said clamping means relative to said body.

7. The invention as defined in claim 6 including means carried by said body for preventing rotation of said nut element.

8. The invention as defined in claim 7 wherein said powered means includes:

a fixed nut secured to said body within said opening and having a smooth bore extending between its opposite ends; and a rotatable nut rotatably carried within said fixed nut bore and having a threaded bore formed therein adapted to selectively engage with said threaded shank.

9. The invention as defined in claim 8 wherein said rotatable nut is formed with a smooth bell-shaped entrance leading into said threaded bore whereby said rotatable nut may spin freely within said fixed nut smooth bore with the terminating end of said threaded shank situated within said bell-shaped entrance when said clamping means is in its advanced position.

10. The invention as defined in claim 9 wherein the extreme end of each cantilevered segment includes a radially extending shoulder adapted to clamp against the workpieces on one side thereof and wherein said segments are separated by a slot so that each of said segments may flex about its root joining the main length of said clamp member.

11. The invention as defined in claim 10 wherein said enlarged head includes a rearwardly sloping surface and said spindle includes an annular recess formed therein immediately behind said sloping surface adapted to receive said segment shoulders in abutting engagement so as to close said slots.

12. The invention as defined in claim 11 wherein said body opening is defined by an annular shoulder integrally formed with said body by forcibly rolling the end of said body over a portion of said fixed nut.

References Cited
UNITED STATES PATENTS

| | | | |
|---|---|---|---|
| 2,370,336 | 2/1945 | Wallace | 85—5 |
| 3,202,037 | 8/1965 | Finkle et al. | 85—81 |
| 3,289,525 | 12/1966 | Lee | 85—81 |

DONALD A. GRIFFIN, *Primary Examiner.*

U.S. Cl. X.R.

85—81